(12) United States Patent
Hadley et al.

(10) Patent No.: US 7,873,494 B2
(45) Date of Patent: Jan. 18, 2011

(54) METHOD AND APPARATUS FOR AN AIRCRAFT LOCATION POSITION SYSTEM

(75) Inventors: Brent Louis Hadley, Kent, WA (US); Patrick Jan Eames, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 449 days.

(21) Appl. No.: 12/038,352

(22) Filed: Feb. 27, 2008

(65) Prior Publication Data

US 2010/0042361 A1 Feb. 18, 2010

(51) Int. Cl.
*G06F 15/00* (2006.01)
(52) U.S. Cl. ...................... 702/158; 702/152
(58) Field of Classification Search .................. 702/150, 702/152, 158
See application file for complete search history.

(56) References Cited

U.S. PATENT DOCUMENTS

| | | | |
|---|---|---|---|
| 3,724,808 A | 4/1973 | Sugden, Jr. | |
| 3,792,713 A | 2/1974 | Zadoo | |
| 3,963,044 A | 6/1976 | Brown | |
| 5,477,459 A * | 12/1995 | Clegg et al. | 701/300 |
| 2008/0173762 A1 | 7/2008 | Crowley | |

OTHER PUBLICATIONS

Manolakis, "Efficient Solution and Performance Analysis of 3-D Position Estimation by Trilateration", IEEE Transactions on Aerospace and Electronic Systems, vol. 32, No. 4, Oct. 1996, pp. 1239-1248.
Rice et al., "Evaluating Lateration-Based Positioning Algorithms for Fine-Grained Tracking", DIALM-POMC'05, Sep. 2, 2005, Cologne, Germany, 2005 ACM, pp. 54-61.
U.S. Appl. No. 11/863,755, filed Sep. 28, 2007, Lea et al.
U.S. Appl. No. 12/468,128, filed May 19, 2009, Tweet et al.
U.S. Appl. No. 61/205,799, filed Jan. 23, 2009, Westerman.

* cited by examiner

*Primary Examiner*—Bryan Bui
(74) *Attorney, Agent, or Firm*—Yee & Associates, P.C.; Robert B. Parker

(57) ABSTRACT

A computer implemented method for identifying location information of an unknown point on an aircraft. The unknown point on the aircraft is identified. A plurality of reference points is identified for the aircraft located in a three-dimensional model of the aircraft, wherein the plurality of reference points have known locations described using a three-dimensional coordinate system to form a plurality of identified reference points. The plurality of identified reference points is displayed on a set of images of the aircraft. A measurement of distance to each of the plurality of identified reference points is obtained to form a plurality of measurements in response to displaying the plurality of identified reference points on the set of images. The location information of the unknown point is identified using the plurality of measurements.

23 Claims, 10 Drawing Sheets

METHOD AND APPARATUS FOR AN AIRCRAFT LOCATION POSITION SYSTEM

BACKGROUND INFORMATION

1. Field

The present disclosure relates generally to an improved data processing system in particular to a method and apparatus for measuring positions on objects. Still more particularly, the present disclosure relates to a computer implemented method, apparatus, and computer program code for identifying location information about objects.

2. Background

Aircraft maintenance technicians conduct routine maintenance as well as replace parts and repair surfaces of aircraft. Maintenance may involve structures in which inspections for corrosion, cracks, or distortion is made. These tasks may be performed inside and outside of various aircraft structures, such as the fuselage, wings, landing gear, or other structures. These different inspections require identifying precise locations.

For example, when a damaged area on an aircraft is identified, location information may be used along with models of the aircraft to identify components that may be affected using a three-dimensional model of the aircraft. Without location information that is precise enough to identify items that may be damaged, a physical inspection of the aircraft is required to identify these potential items. An aircraft maintenance technician may identify the damaged area and then count the number of frames from that location to one end of the aircraft to identify the position in the aircraft. This type of procedure is time consuming as well as potentially inaccurate. Further, the accuracy of the identification may not be as high as desired for identifying potentially affected components.

For example, an aircraft may have skin sections measured in inches in which each skin section has a specific structure that may be different from other surrounding skin sections. Precise location information becomes critical in performing repairs on these and other types of aircraft parts.

Currently used processes for gathering information on an aircraft uses a station line, a butt line, and a water line to identify locations of components. The station line is the X axis of a system. This line is positive pointing towards the aft part of the aircraft and typically begins somewhere before the nose of the fuselage. The butt line is the Y axis of the aircraft. This axis is positive pointing along the aircraft's left wing. The water line is the Z axis of the aircraft. This axis points upward. This type of location information is used with three-dimensional models of the aircraft to identify components and information about components in the area where damage may be identified. This type of information also may be used to identify locations for maintenance or locations where other inspections may be performed.

Measurement of location information on a large object, such as an aircraft, is a difficult process with currently used techniques. These techniques require fixed positions for the measurement equipment. One technique for measuring location information utilizes a theodolite, which is an optical instrument that measures both horizontal and vertical angles. This instrument typically consists of a small mounted telescope that is rotatable in both horizontal and vertical planes. The use of this type of instrument is limited because the instrument requires a fixed location to perform measurements.

Another technique used to measure objects involves photogrammetry. The technique is a remote sensing technology in which geometric properties about the objects are identified from photographic images. This technique may identify three-dimensional coordinates for points on an object based on measurements made in two or more photographic images taken from different positions.

Yet another technique that may be used to identify location information on objects utilizes lasers. Currently, the use of lasers also requires fixed position measurement equipment. Additionally, these different techniques also have high costs relative to the accuracy desired in identifying location information.

The currently available measurement techniques are capable of providing measurements with the tolerances needed for aircraft. These systems, however, are limited by these measuring instruments being in fixed locations.

With the use of fixed positions, the fixed position from a measurement is taken in a known location that is not in motion. This type of requirement increases the cost and time needed to identify locations. In identifying coordinates for a three-dimensional coordinate system, these coordinates may be located using an estimation from fixed hard points and locations on the aircraft. These types of guesses may produce errors in the process of determining an exact location. The currently used techniques provide adequate results when a sufficient representation of the object being searched exists. These techniques, however, still may not provide the needed precision in large areas, very small areas, or areas in which modifications have occurred.

Therefore, it would be advantageous to have a method and apparatus that overcomes the above described problems.

SUMMARY

The advantages embodiments provide a computer implemented method for identifying location information of an unknown point on an aircraft. The unknown point on the aircraft is identified. A plurality of reference points is identified for the aircraft located in a three-dimensional model of the aircraft, wherein the plurality of reference points have known locations described using a three-dimensional coordinate system to form a plurality of identified reference points. The plurality of identified reference points is displayed on a set of images of the aircraft. A measurement of distance to each of the plurality of identified reference points is obtained to form a plurality of measurements in response to displaying the plurality of identified reference points on the set of images. The location information of the unknown point is identified using the plurality of measurements.

In another advantageous embodiment, a computer implemented method is present for identifying location information for points associated with an object. An unknown point is identified for the object. A plurality of reference points is identified for the object, wherein locations of the plurality of reference points are known in a three-dimensional coordinate system. A measurement of distance to each of the plurality of reference points is obtained to form a plurality of measurements. The location information for the unknown point is identified using the plurality of measurements.

In yet another advantageous embodiment, an apparatus comprises a model of an object, a location process, and a portable data processing system. The location process is capable of identifying a plurality of reference points for the aircraft located in a three-dimensional model of the object, wherein the plurality of reference points have known locations described using a three-dimensional coordinate system to form a plurality of identified reference points; displaying the plurality of identified reference points on a set of images of the object; obtaining a measurement of distance to each of the plurality of identified reference points to form a plurality of measurements in response to displaying the plurality of identified reference points on the set of images; and identifying a location of the unknown point using the plurality of measurements. The model of the object and the location process are located on the portable data processing system.

In still yet another advantageous embodiment, a computer program product is provided. The computer program product comprises a computer usable medium having computer usable program code for identifying location information of an unknown point on an aircraft. Computer usable program code is present for identifying the unknown point on the aircraft. Computer usable program code also is present for identifying a plurality of reference points for the aircraft located in a three-dimensional model of the aircraft, wherein the plurality of reference points have known locations described using a three-dimensional coordinate system to form a plurality of identified reference points. The computer program product also has computer usable program code for displaying the plurality of identified reference points on a set of images of the aircraft. Computer usable program code, responsive to displaying the plurality of identified reference points on the set of images, is present for obtaining a measurement of distance to each of the plurality of identified reference points to form a plurality of measurements. The computer program product also includes computer usable program code for identifying the location information of the unknown point using the plurality of measurements.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
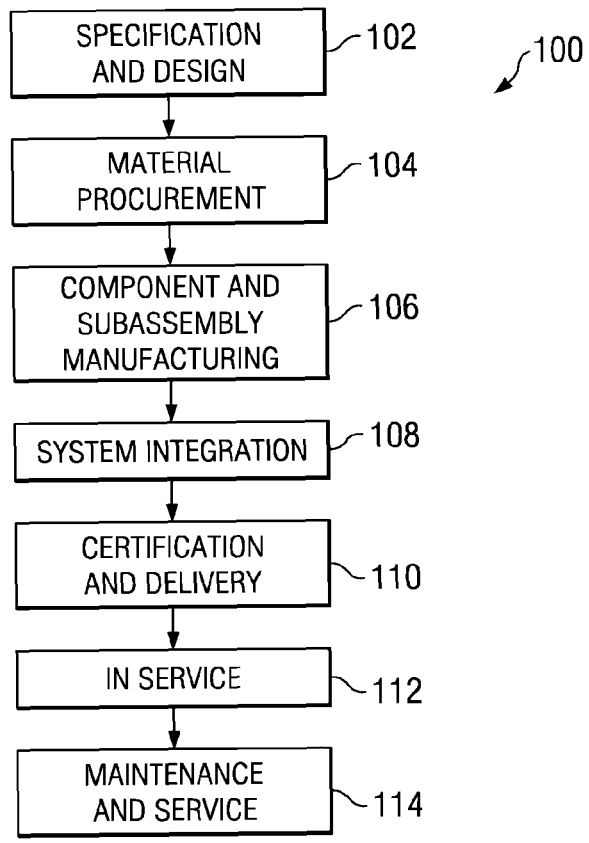
FIG. 1 is a diagram illustrating an aircraft manufacturing and service method in accordance with an advantageous embodiment.
Figure 2:
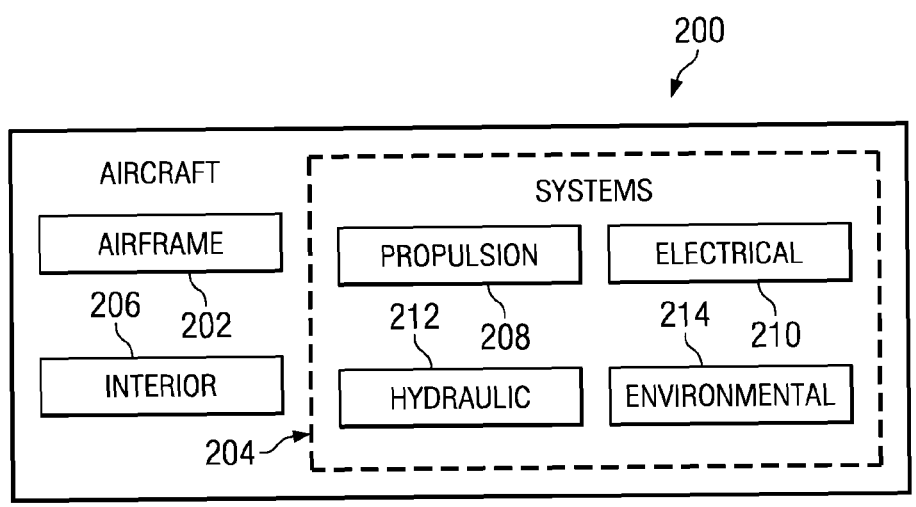
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive, truck, or ship building industries.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments may be implemented during maintenance and service 114 to perform repairs. For example, the different advantageous embodiments may be used to identify location information with respect to damaged components. For example, if damage occurs to the top of a fuselage structure, location information is needed to find information about the fuselage skin at that particular position. Further, this information also may be used to identify other components that may be affected by the damage. The components include, for example, frames, stringers, splices, and other structural items.

As another example, damage to a crown splice is structural in nature. This damage, however, also may require examination of other systems that may have suffered damage. These systems include, for example, electrical systems, hydraulic systems, avionic systems, and other systems that may be affected by damage to a splice. The damage also may affect wiring systems. These wiring systems may control the flight communication systems.

Further, the damage also may affect tubing that connects hydraulic systems controlling the primary flight controls. Information about these systems is needed because they run through the crown splice area. The different advantageous embodiments provide the location information used to locate and examine these components.

Figure 3:
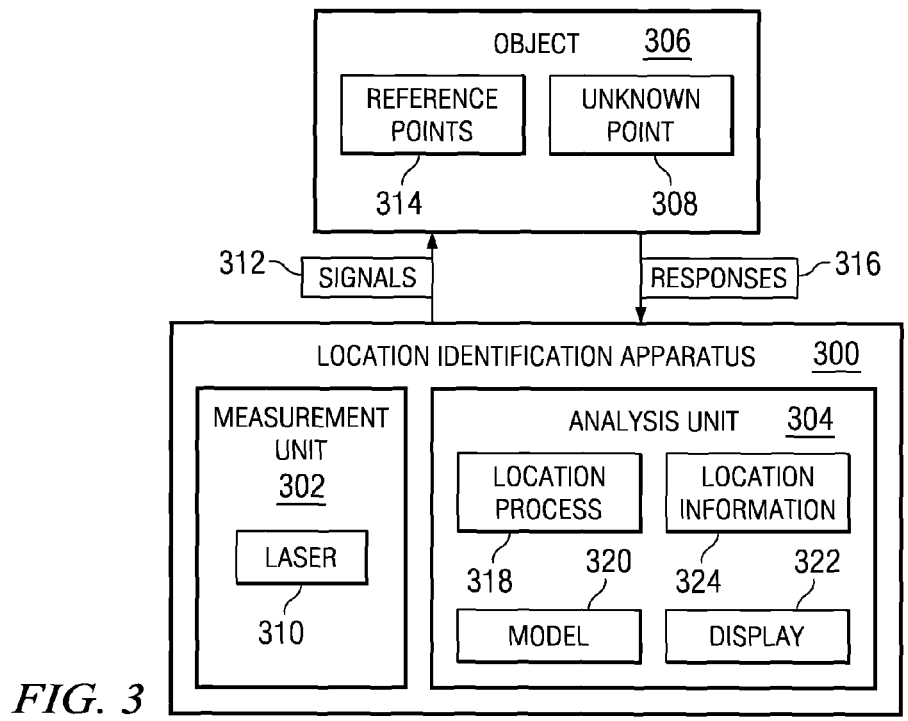
FIG. 3 is a block diagram illustrating a location identification apparatus in accordance with an advantageous embodiment.

With reference now to FIG. 3, a block diagram illustrating a location identification apparatus is depicted in accordance with an advantageous embodiment. In these examples, location identification apparatus 300 includes measurement unit 302 and analysis unit 304. These components may be used to obtain location information about object 306. In the different advantageous embodiments, location identification apparatus 300 is a portable system.

In this example, measurement unit 302 includes laser 310. Measurement unit 302 may be implemented using any available laser range finder. For example, a Leica DISTO™ A6 is an example of a laser range finder that may be used to implement measurement unit 302. Leica DISTO™ A6 is a laser range finder that is available from Leica Geosystems AG of St. Gallen, Switzerland. Analysis unit 304 may be any suitable mobile terminal implemented using any data processing system. For example, a laptop computer, a personal digital assistant, or a mobile phone may be used to implement analysis unit 304.

In these examples, an identification of location information for unknown point 308 may be identified using location identification apparatus 300. Laser 310 may be used to send signals 312 to various points on object 306. In these examples, a signal within signals 312 is sent to unknown point 308. Additionally, other signals in signals 312 are sent to reference points 314. Responses 316 are received from signals 312 and detected by measurement unit 302. These responses may be sent by measurement unit 302 to analysis unit 304 to identify location information for unknown point 308.

Analysis unit 304 includes location process 318, model 320, and display 322. In these examples, location process 318 may identify location information about unknown point 308 based on responses 316 received from signals 312 sent to unknown point 308 and reference points 314. Location process 318 may include one or more processes for identifying an unknown point using measurements from known points. These processes may include, for example, without limitation, mathematical methods such as triangulation, trilateration, and multilateration. Triangulation identifies an unknown location by calculating the length of one side of a triangle based on distance and angle measurements to known reference points. Trilateration identifies an unknown location by using the geometry of triangles and spheres. Trilateration does not use angle measurements, but relies solely on distance measurements. Multilateration identifies an unknown location using a process similar to triangulation and trilateration using three or more known reference points.

In these examples, reference points 314 may be points found in model 320. Model 320 is a model of object 306 in these examples. Model 320 contains data representing object 306. In other words, model 320 is not a physical model. Model 320 may include identification of various points. In these examples, reference points 314 are points within model 320 that have known location information. In other words, the location of these reference points with respect to a three-dimensional coordinate system is known. This identification may include location information, such as, for example, X, Y, and Z coordinates for different reference point within reference points 314.

In the illustrative embodiments, model 320 may be as simple as a collection of reference points having known location information along with images of the aircraft. In other words, model 320 only contains reference points with non-location information. In this type of embodiment, model 320 also may include other information needed to select the appropriate reference point for use by location process 318. These reference points may be associated with the different images of the aircraft. As a result, based on the orientation of the operator with respect to the aircraft, a particular image of the aircraft may be selected along with the associated reference points. In other advantageous embodiments, model 320 may take the form of a three-dimensional computer aided design model of the aircraft along with information about various locations and components. Of course, any three-dimensional model may be used in which reference points may be selected for use in identifying location information about an unknown point on object 306.

In this illustrative example, location process 318 selects points within model 320 to form reference points 314. Reference points 314 are presented on display 322. This presentation or display of reference points 314 on display 322 allows an operator of location identification apparatus 300 to locate and send signals 312 to reference points 314 on object 306 to obtain the measurements from responses 316.

In these examples, reference points 314 may be three or more reference points. In the advantageous embodiments, five reference points may be used to obtain responses 316. Further, reference points 314 may be selected such that the reference points are not found on the same plane or same lines within model 320. By avoiding co-planarity and co-linearity, increased accuracy in identifying the location of unknown point 308 may occur.

Location process 318 may take responses 316 and model 320 to generate location information 324 for unknown point 308. Location information 324 may then be presented on display 322. In these examples, the location information may take the form of X, Y, and Z coordinates. Of course, location information 324 also may take other forms. For example, a polar coordinate system may be used instead of a Cartesian coordinate system.

Further, analysis unit 304 may receive user input identifying unknown point 308 through display 322. For example, display 322 may be a touch screen device allowing the user to select portions of an object displayed on display 322. User input also may take the form of a voice input.

Further, based on the selection of unknown point 308 by the operator, location process 318 may select or suggest reference points from model 320 to form reference points 314 for object 306. These reference points may be identified in display 322. For example, an image of object 306 may be presented on display 322 with an indicator to identify the reference point for which measurement unit 302 should send a signal within signals 312 to object 306.

The illustration of location identification apparatus 300 is not meant to imply architectural limitations to the manner in which this apparatus may be implemented. For example, location identification apparatus 300 may be implemented in a single physical unit in which both measurement unit 302 and analysis unit 304 are present. In other advantageous embodiments, measurement unit 302 may be a separate device from analysis unit 304. With this type of implementation, responses 316 detected by measurement unit 302 may be sent to analysis unit 304 through user input. In still other advantageous embodiments, measurement unit 302 may send measurements generated from responses 316 to analysis unit 304 through a wireless link.

Figure 4:
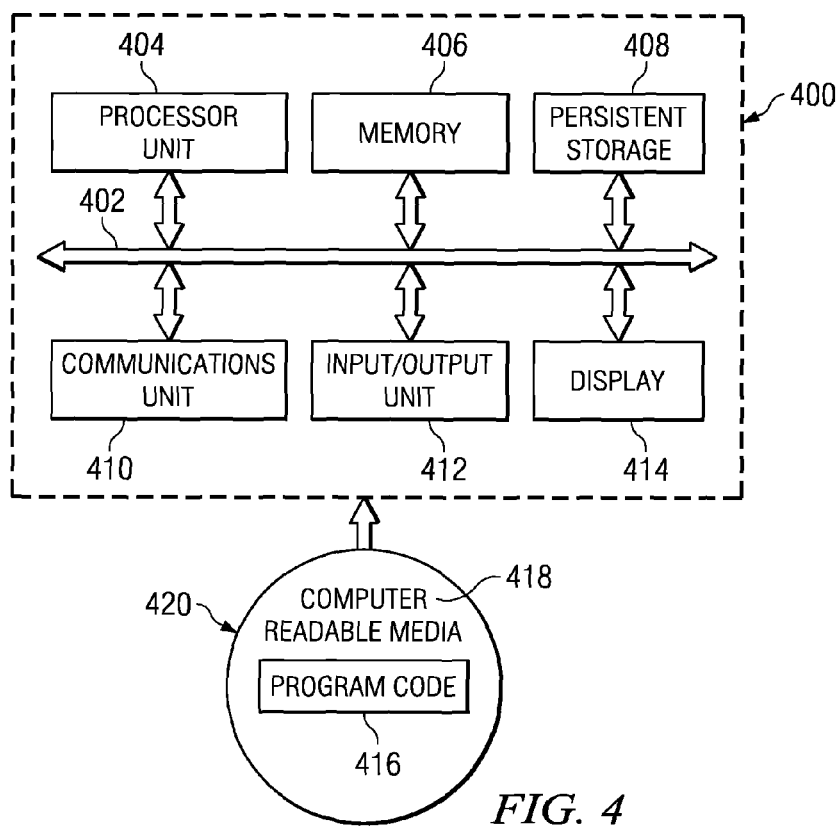
FIG. 4 is a diagram of a data processing system in accordance with an illustrative embodiment.

Turning now to FIG. 4, a diagram of a data processing system is depicted in accordance with an illustrative embodiment. Data processing system 400 is an example of a device that may be used to implement analysis unit 304 in FIG. 3.

In this illustrative example, data processing system 400 includes communications fabric 402, which provides communications between processor unit 404, memory 406, persistent storage 408, communications unit 410, input/output (I/O) unit 412, and display 414. Data processing system 400 is an example of a data processing system that may be used to implement location identification apparatus 300.

Further, if the operator of location and implementation of apparatus 300 is not located at the unknown point, location process 318 may process responses 316 to identify the location and implementation of apparatus 300. At this point, the location of apparatus 300 forms an additional reference point. A signal within signals 312 sent unknown point 308 may result in a measurement in responses 316 used to identify location information for unknown point 308.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

As one example, a storage device in data processing system 400 is any hardware apparatus that may store data. Memory 406, persistent storage 408 and computer readable media 418 are examples of storage devices in a tangible form.

Data processing system 400 may take various forms. For example, data processing system 400 may be a laptop computer, a personal digital assistant, or even a mobile phone, depending on the particular implementation.

Figure 5:
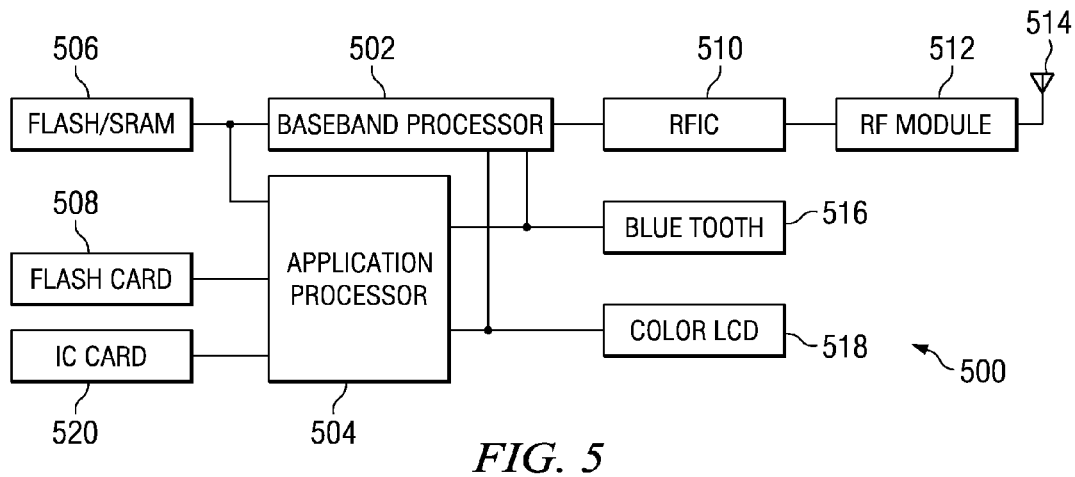
FIG. 5 is a block diagram of a mobile terminal in accordance with an illustrative embodiment.

Turning next to FIG. 5, a block diagram of a mobile terminal is depicted in accordance with an illustrative embodiment.

In the advantageous embodiments, mobile terminal 500 is an example of a device that may be used to implement analysis unit 304 in FIG. 3.

Mobile terminal 500 includes baseband processor 502, application processor 504, flash/static random access memory (SRAM) 506, flash card 508, radio frequency integrated circuit (RFIC) 510, radio frequency (RF) module 512, antenna 514, Blue Tooth unit 516, color liquid crystal display (LCD) 518, and integrated circuit (IC) card 522.

Baseband processor 502 provides for receiver and transmitter operations and is also referred to as a transceiver. In particular, baseband processor 202 handles all of the audio, signal, and data processing needed to receive and send data using radio frequency transmissions or Blue Tooth transmissions. Application processor 504 provides the processing power for other functions within mobile terminal 500. For example, calculators, calendars, alarms, camera functions, and directories are provided through application processor 504. Flash/SRAM 506 is a storage device in which various instructions for providing the functions within mobile terminal 500 are located and provide upgrades. Flash card 508 is a storage device in which user data and applications may be stored. An example of flash card 508 is a secure digital card.

A pathway for the transmission of voice and other types of data is through radio frequency integrated circuit 510. Additionally, short range transmissions may be sent or received through Blue Tooth unit 516. Blue Tooth unit 516 conforms to Blue Tooth wireless specification, which defines the link layer and application layer for product developers. Both of these transmissions are made through antenna 514 in this illustrative example.

Color LCD 518 provides a display for pictures and other data for mobile terminal 500. Integrated circuit card 520 also may contain other application specific functions, such as a global positioning system (GPS) or other functions, such as a modem or additional memory Instructions or circuits are included to mobile terminal 500 to identify an unknown point or location based on measurements from reference points with known location information. Mobile terminal 500 is an example of another device that may be used to implement a portion of location identification apparatus 300 in FIG. 3. In particular, mobile terminal 500 may be used to implement analysis unit 304 in FIG. 3. Mobile terminal 500 may take various forms and the depicted example is not meant the manner in which a mobile terminal may be implemented. In this example, mobile terminal 500 may be a mobile phone. In other embodiments, mobile terminal 500 may just include components needed to display information and perform functions to identify location information. As an example, in other embodiments, mobile terminal 500 may not include components to transmit and receive information.

Figure 6:
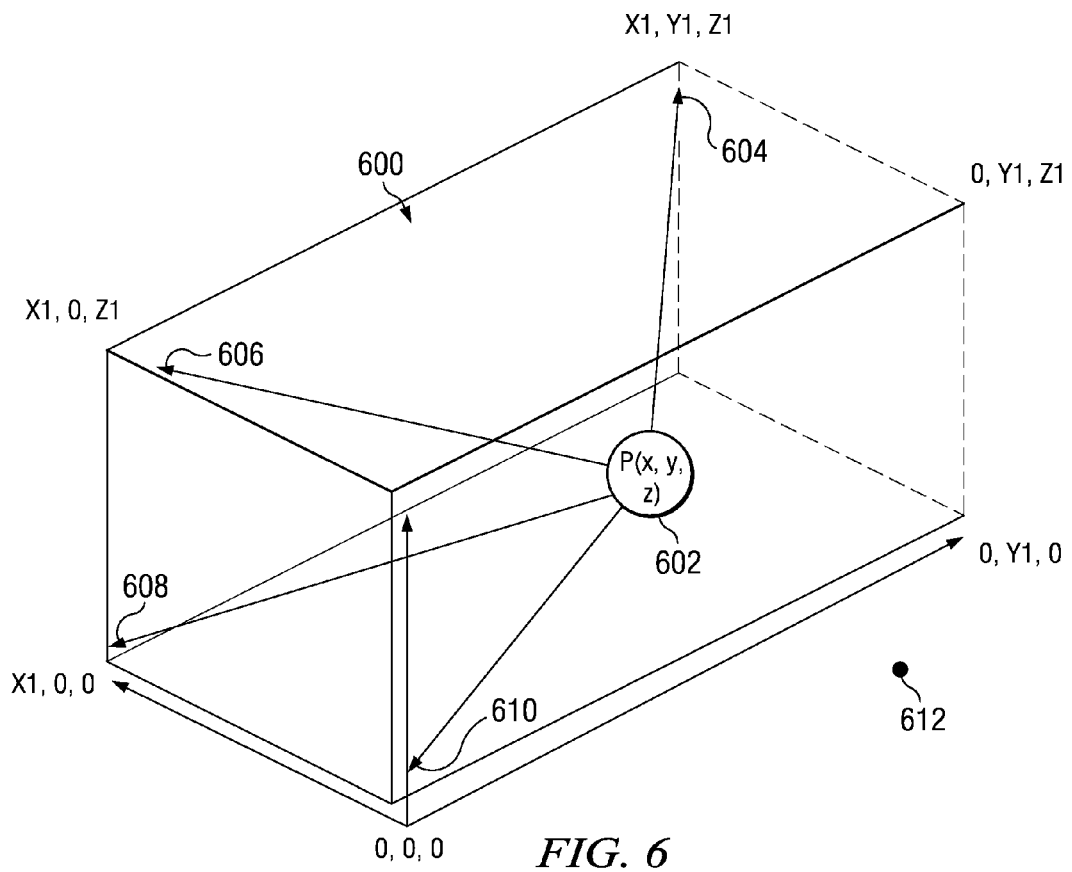
FIG. 6 is a diagram illustrating the identification of location information for an object in accordance with an advantageous embodiment.

Turning now to FIG. 6, a diagram illustrating the identification of location information for an object is depicted in accordance with an advantageous embodiment. Room 600 is one example of object 306 in FIG. 3. In this depicted example, the location information is for a location within room 600. Unknown point 602 is a point within room 600 having location information that may be identified using X, Y, and Z coordinates. A location identification apparatus such as location identification apparatus 300 in FIG. 3 may be located at unknown point 602.

Measurements of distance from unknown point 602 may be taken to reference points 604, 606, 608, and 610 in these examples. Reference points 604, 606, 608, and 610 have known X, Y, and Z coordinates in room 600. The distance from unknown point 602 to these reference points may be used to identify the X, Y, and Z coordinates for unknown point 602. These different reference points are on different portions of the wall of room 600 in these examples.

In yet another advantageous embodiment, the location identification apparatus may be at another point other than unknown point 602. In this advantageous embodiment, a location identification apparatus may be located at, for example, point 612. The location identification apparatus may take measurements of distance from point 612 to reference points 604, 606, 608, and 610. With this information, the location information of point 612 may be identified. Additionally, the location identification apparatus also makes a measurement to point 602. The measurements to the reference points are used to identify the location of point 612. Point 612 becomes an additional reference point. In this manner, when point 612 is known, the additional measurement of distance to point 612 allows for an identification of location information for unknown point 602.

Figure 7:
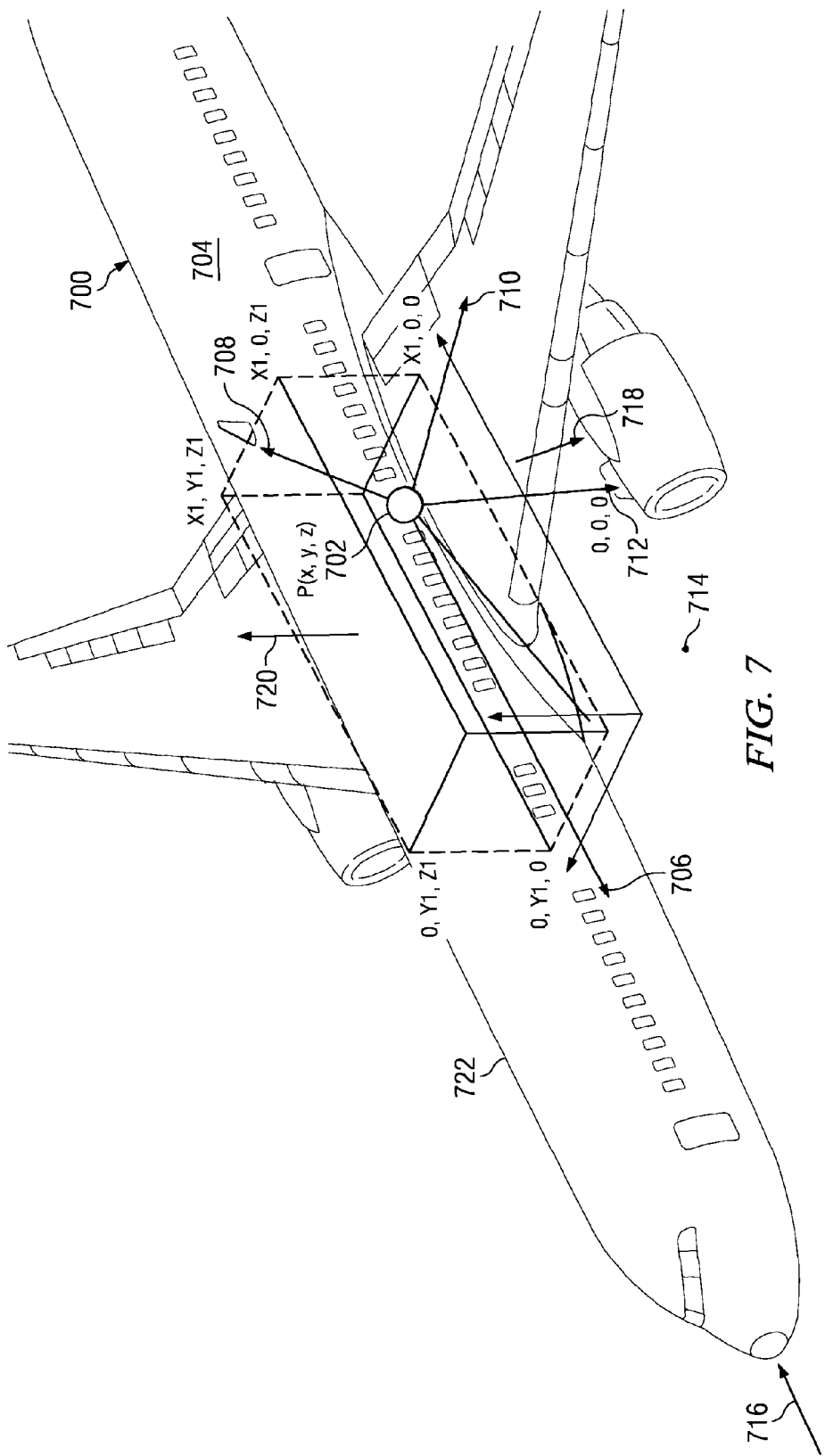
FIG. 7 is a diagram illustrating the identification of location information for an object in the form of an aircraft in accordance with an advantageous embodiment.

Turning now to FIG. 7, a diagram illustrating the identification of location information for an object in the form of an aircraft is depicted in accordance with an advantageous embodiment. In these examples, aircraft 700 is an example of object 300 in FIG. 3. In this advantageous embodiment, an identification of location information may be obtained for unknown point 702 on aircraft 700.

In this example, unknown point 702 is a point on fuselage 704 of aircraft 700. In this example, measurements of distance may be made from unknown point 702 to reference points 706, 708, 710, and 712 on aircraft 700. With these measurements, an identification of location information for unknown point 702 may be made. Reference points 706, 708, 710, and 712 have known X, Y, and Z coordinates.

In yet another advantageous embodiment, an operator of the location identification apparatus at point 714 may take measurements of reference points 706, 708, 710 and 712 to obtain location information for point 714. Additionally, the operator also may take a measurement of unknown point 702. With the measurements to the reference points, unknown point 702, and the known location information for the reference points, location information for unknown point 702 may be identified from an operator of a location identification apparatus at point 714.

In these examples, the location information takes the form of X, Y, and Z coordinates. In this example, X axis 716 is the station line of aircraft 700. X axis 716 is positive towards the aft of aircraft 700. Y axis 718 forms the butt line of aircraft 700 and Z axis 720 forms the water line of aircraft 700. Y axis 718 is positive along the left wing of aircraft 700. Z axis 720 is positive upward from top 722 of fuselage 704 in aircraft 700.

The selection of reference points may be for identifiable features on aircraft 700 to ensure additional accuracy in identifying location information for unknown point 702. Any identifiable feature in these examples is a feature that an operator may use to obtain a measurement with a desired level of accuracy with a measurement unit. In other words, the feature is considered an identifiable feature if the operator is able to find the feature and direct the measurement unit to obtain a measurement from that feature. For example, selecting and presenting a point at the top of a tire on a landing gear may be considered an identifiable feature as compared to presenting a point on the side of a fuselage in which the features are large enough such that measurements may vary depending on where the operator points the measurement device.

Figure 8:
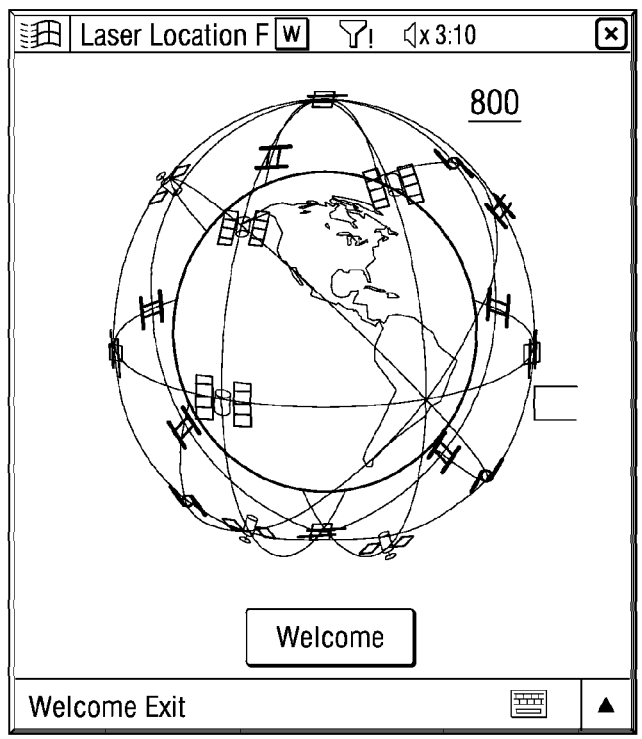
FIGS. 8-12 are diagrams illustrating screens in a graphical user interface in accordance with an advantageous embodiment.

Turning now to FIGS. 8-12, diagrams illustrating screens in a graphical user interface are depicted in accordance with an advantageous embodiment. In these examples, FIGS. 8-12 are examples of user interfaces that may be presented on a display, such as display 322 in FIG. 3. In this example, FIG. 8 illustrates an initial display in which screen 800 is a welcome screen, allowing the user to begin obtaining location information. In this example, screen 800 is an example of a display screen on an analysis unit that takes the form of a mobile phone. Of course, in other embodiments, the analysis unit may be a laptop computer, personal digital assistant, or some other suitable device.

Figure 9:
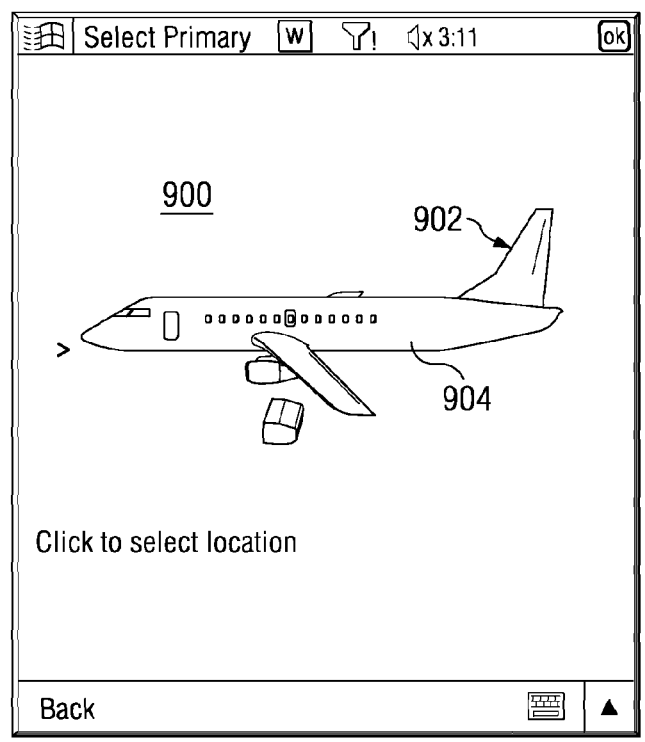

In FIG. 9, screen 900 displays aircraft 902. In these examples, the user may have the model of the aircraft pre-loaded onto the location identification apparatus. In other advantageous embodiments, the user may select a particular aircraft. Further, the user also may select the orientation from which the location identification apparatus is to be used with respect to the aircraft.

In this example, the user identifies unknown point 904 on the display of aircraft 902 within screen 900. This identification may be made using various user input mechanisms, such as a track ball, pointing device, or touch screen. In this example, unknown point 904 may be an area in which damage has been identified by an aircraft maintenance technician.

Figure 10:
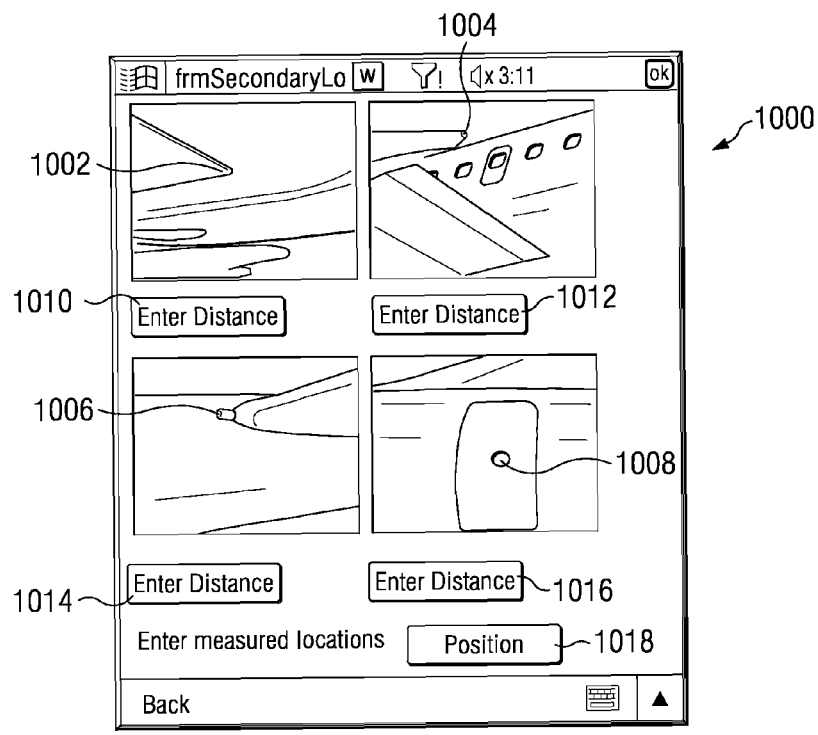

After unknown point 904 is selected, the location identification apparatus displays screen 1000 in FIG. 10. This screen identifies reference points on aircraft 902 in FIG. 9 for which measurements should be taken using the location identification apparatus. For example, screen 1000 identifies reference points 1002, 1004, 1006, and 1008 on different portions of aircraft 902 in FIG. 9. These reference points are selected, in these examples, as easily identifiable points on an aircraft.

Additionally, screen 1000 also includes input fields 1010, 1012, 1014, and 1016 for measurements. In this example, the measurements are input by the operator of the location identification apparatus. In other advantageous embodiments, these measurements may be transferred directly from the measurement unit to the analysis unit.

Figure 11:
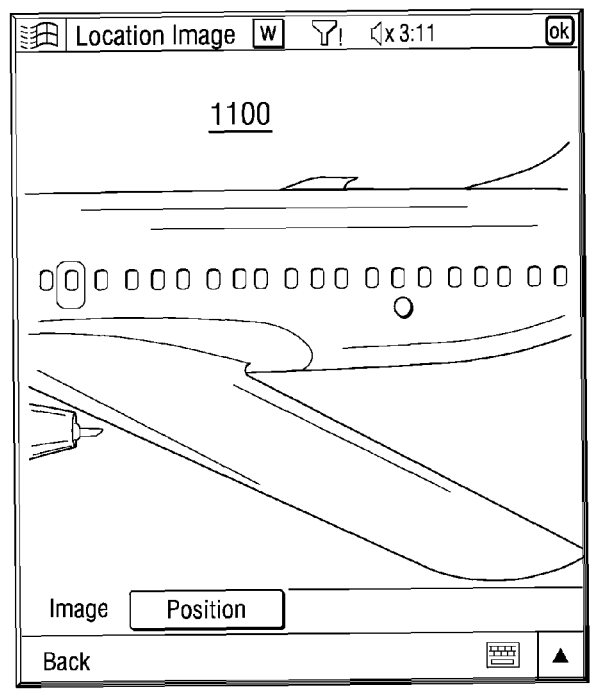
Figure 12:
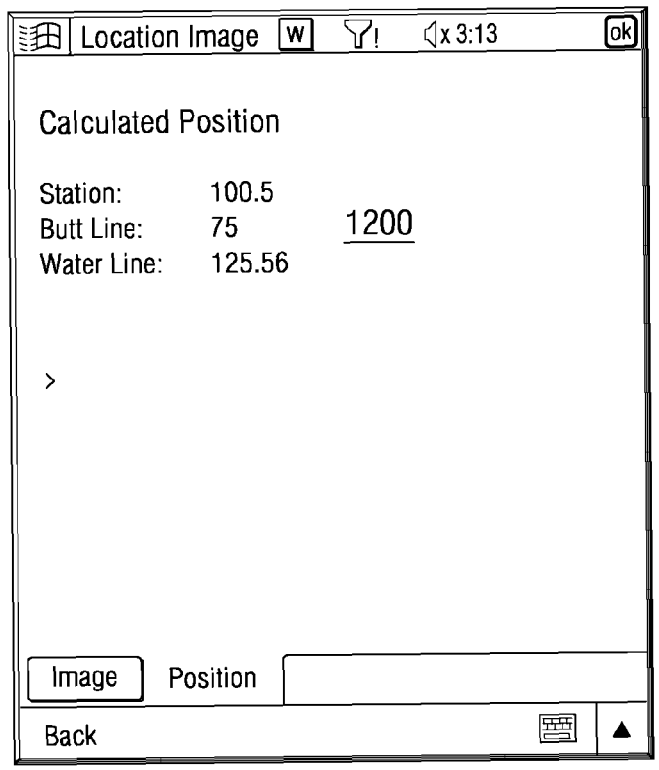

After the different distances for the reference points have been measured and input, a selection of control 1018 results in a display of screen 1100 in FIG. 11 and screen 1200 in FIG. 12. Screen 1100 in FIG. 11 confirms the unknown point selected by the user, while screen 1200 in FIG. 12 identifies the station, butt line, and water line for the aircraft. These are coordinates that correspond to X, Y, and Z coordinates.

Figure 13:
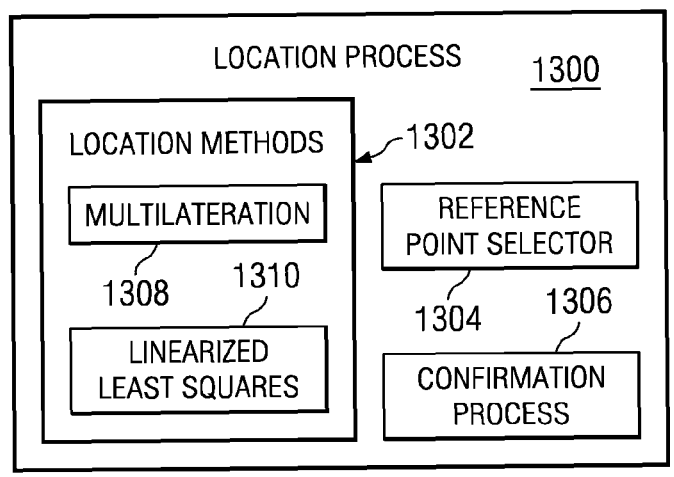
FIG. 13 is a block diagram of a location process in accordance with an advantageous embodiment.

Turning now to FIG. 13, a block diagram of a location process is depicted in accordance with an advantageous embodiment. In this example, location process 1300 is a more detailed example of location process 318 in FIG. 3. Location process 1300 includes location methods 1302 and reference point selector 1304. Location methods 1302 may include one or more processes for identifying locations of unknown points based on measurements taken from reference points.

In this illustrative example, location methods 1302 include multilateration 1308 and linearized least squares 1310. Of course, location methods 1302 may include other methods in addition to or in place of the ones depicted. For example, other methods may include non-linear regression, random sample consensus, and iterative non-linear regression.

In these examples, multilateration 1308 may implement iterative non-linear regression to estimate the location of an unknown point. This type of process uses a data fitting function. The results of these two processes are compared by confirmation process 1306. The results from both of those processes are used by confirmation process 1306 to determine whether the results from location methods 1302 should be used. A comparison of the results from multilateration 1308 and linearized least squares 1310 is used as a dual check of the reliability and validity of the location information identified for the unknown point.

In the different advantageous embodiments, a user may select a threshold, such as a confidence level in the calculation. For example, the user may decide that the difference between the results of the two methods should be less than one percent. Of course, any other percent or value may be used, depending on the particular implementation. Further, this confidence level may be pre-selected or based on some policy.

In these examples, the determination of the accuracy may be performed by back fit calculation. The calculated position of the unknown point is used as a reference point. The calculations are computed to determine if the calculated position at the unknown point is within the selected percentage.

For example, the unknown point is calculated. A known reference point is assumed as an unknown point. Then, the multilateration 1308 and linearized least squares 1310 are run using the calculated position in the unknown point. The result for the assumed unknown point is compared to the known location for the reference point. Thereafter, an error is identified. If the error is less than the selected threshold, then the result is identified as being a good result in these examples.

In the depicted examples, multilateration 1308 is implemented using an iterative non-linear regression technique. This technique involves data fitting. A determination is made as to how a set of inputs, such as distance measurements and known reference point locations, can provide a best fit. Regression analysis is used to estimate the location of the unknown point. The data fitting function used by multilateration 1308 combines the range distance measurements, the known reference point location, and the unknown point to determine the location of the unknown point. The following equation of a sphere is used.

$$d_i = \sqrt{(x_i-x_0)^2+(y_i-y_0)^2+(z_i-z_0)^2} \quad (1)$$

Where $d_i$ is the distance, $(x_i, y_i, z_i)$ is the known reference point location, and $(x_0, y_0, z_0)$ is the unknown point location. This equation may be used to calculate the distance between two points in three-dimensional space. A series of three by three matrices are computed using non-linear regression. The best solution of this system of equations is identified. A visualization of this solution is the intersection of multiple spheres in which the center of each sphere is a reference point and the radius of the sphere is measured distance to the unknown point.

In multilateration 1308, a single instance of this non-linear regression results in a calculated position. This single calculation performs well when the measurements are mathematically exact. However, over a non-exact set of data points, an iterative form of non-linear regression performs better. In the iterative form, a data point that disagrees with other data points and that does not encourage solution convergence is discarded and the calculation is performed again.

In the different advantageous embodiments, multilateration 1308 selects combinations of three points and calculates a solution. Multilateration 1308 repeats this process until insufficient convergent measurements are present. At this time, the algorithm fails or convergence is achieved. The final circular degree of precisions is the predicted error.

In the depicted examples, the multilateration 1308 seeks a solution to Equation 1.

$$R_i = \sqrt{(x_i-x)^2+(y_i-y)^2(z_i-z)^2} \quad (2)$$

When X represents an X coordinate, Y represents a Y coordinate, Z represents a Z coordinate, and R is a distance.

The process begins by setting up its data structures. Then multilateration 1308 seeks to find a solution to Equation 2 by iterating over selected subsets of three known reference points from the group of all reference points. On each selected subset of points, multilateration 1308 performs a non-linear regression fit. This fit is performed by linearly regressing by some small λ, while λ is increasing perform a single iteration of the Marquardt non-linear regression method.

This linear regresssing is performed until the results change negligibly or until the maximum desired number of iterations is reached. A Marquardt non-linear regression modifieds the A matrix by Equation 3, and then substituting A' for A in Equation 2 and solving by Gauss-Jordan elimination. The algorithm then returns the best solution to Equation 2.

$$A' = A \times (1 + \lambda) \quad (3)$$

A is a matrix and λ is a value selected to cause the calculation to grow or increase to the solution. Linearized least squares 1310 linearizing Equation 4. The solution is then represented by the matrices A and b in Equation 2. The linearization method considers the intersection of infinite planes.

Each pair of spheres intersect within a plane. Intersection of all these planes coincides with the intersection of the spheres from the lateration solution and therefore, the location of the unknown point. The algorithm expands the A matrix to be three by the number of known reference point times two. It expands the b matrix in a similar manner.

In these examples, linearized least squares 1310 begins by linearizing the A matrix to A'. This linearizing is performed through Equation 4. The b matrix is linearized to b' by Equation 3. The new matrixes combined into Equation 6, which is then solved by Gauss-Jordan elimination.

$$A_{i,j}' = 2 \times (x_i - x_j) \quad (4)$$

$$b_i' = (d_i^2 - d_0^2) - (x_i^2 - x_0^2) - (y_i^2 - y_0^2) - (z_i^2 - z_0^2) \quad (5)$$

$$(A'^T A')^{-1} A'^T b' = x \quad (6)$$

Linearized least squares 1310 then returns x as the solution. In these examples, d represents the distance. $d_0$ may be the initial distance, such as the distance at the unknown point. Also, in these examples, $d_i$ may be varied for different distances.

Figure 14:
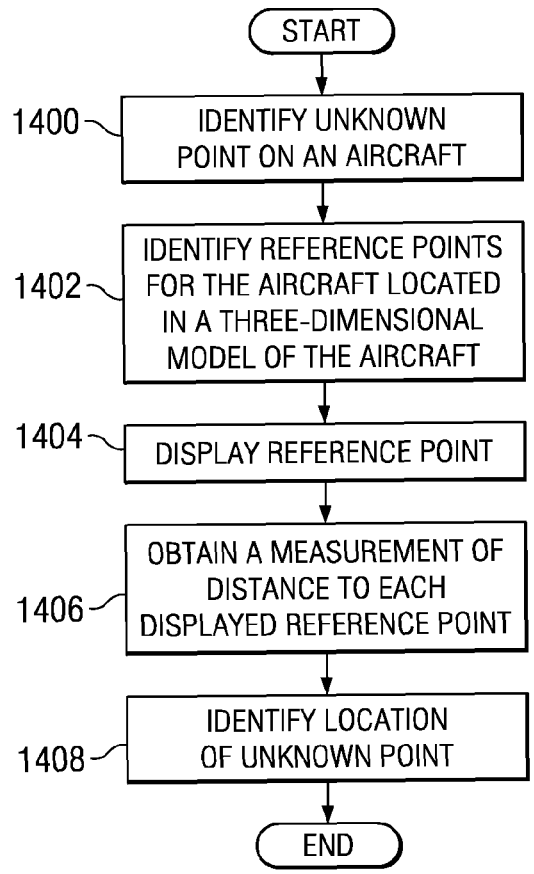
FIG. 14 is a process for identifying location information for an unknown point on an aircraft in accordance with an advantageous embodiment.

With reference next to FIG. 14, a process for identifying location information for an unknown point on an aircraft is depicted in accordance with an advantageous embodiment. The process illustrated in FIG. 14 may be implemented in a process, such as location process 318 in FIG. 3.

The process begins by identifying an unknown point on an aircraft (operation 1400). This unknown point on the aircraft may be inside or outside of the aircraft depending on the particular implementation. The unknown point may be identified through user input selecting a point on the aircraft from an image of the aircraft. For example, this identification may be made using screen 900 in FIG. 9.

The process then identifies reference points for the aircraft located in a three-dimensional model of the aircraft (operation 1402). In these examples, the reference points have known locations that are described using a three-dimensional coordinate system to form identified reference points. In the different advantageous embodiments, typically three or more reference points are used. For example, five reference points may be used. These reference points may be selected to be on different planes in different lines.

Thereafter, the reference points are displayed (operation 1404). The display of the reference points may be performed using screen 1000 in FIG. 10. The display of reference points guides a user in making measurements for the identified reference points. The display of the reference points may be on an image of the object. Additionally, the display of reference points may be on identifiable features of the object depending on particular implementation. By selecting reference points on identifiable features, more accurate measurements may occur as opposed to selecting reference points on a feature that may cause greater variance in measurements.

For example, an identifiable feature may be a pylon leading to an edge seam on an engine. This pylon is a portion of the engine that sticks upwards and resembles a fin. Another example of an identifiable feature may be, for example, the leading edge of a landing gear truck. This leading edge has a point that is easily identifiable by an operator of a location identification apparatus. Further, the size of this feature may be such that the measurement is less likely to vary as opposed to selecting a reference point on a side of the fuselage in which no identifying marks are present. Another example of an identifiable feature is a top portion of a window in the fuselage of the aircraft. Of course, any identifiable feature may be used when identifiable features are desired as reference points.

The process then obtains a measurement of distance to each displayed reference point (operation 1406). Operation 1406 may be performed by receiving data input by a user into a user interface, such as screen 1000 in FIG. 10. In other advantageous embodiments, the measurement information may be received directly from the measurement unit as measurements are made. The process identifies the location of the unknown point using the measurements (operation 1408), with the process terminating thereafter. Operation 1408 may employ various processes or techniques to solve for an unknown point when a number of known points are present. In the advantageous embodiments, operation 1402 may be performed before operation 1400. In this manner, an operator may identify reference points and then have the process identify the relative coordinates of a previously identified point of interest. For example, a maintenance worker may have trouble finding the particular problem area. In this situation, the different advantageous embodiments may be employed to display/identify the problem area based on the known reference points.

Figure 15:
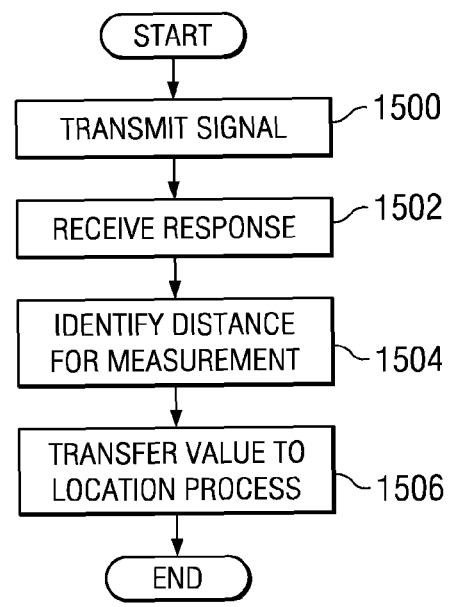
FIG. 15 is a flowchart of a process for obtaining a measurement of a point in accordance with and advantageous embodiment.

Turning now to FIG. 15, a flowchart of a process for obtaining a measurement of a point is depicted in accordance with and advantageous embodiment. The process in FIG. 15 may be implemented using a device, such as measurement unit 302 in FIG. 3. These measurements may be made by an operator of a location identification apparatus, such as location identification apparatus 300 in FIG. 3.

The process begins by transmitting a signal (operation 1500). This signal is a pulse of laser light transmitted by the measurement unit. Thereafter, a response is received (operation 1502). This response is the return signal detected in response to the signal being transmitted to a reference point or the unknown point. The process then identifies the distance for the measurement (operation 1504).

Thereafter, the value of the measurement is transferred to a location process (operation 1506) with the process terminating thereafter. This process may be repeated for each reference point that is identified.

Further, this process also may be used if the location identification apparatus is located at a point other than the unknown point. These examples are illustrated with respect to identifying unknown points on an aircraft. The different advantageous embodiments may be applied to other objects other than aircraft. For example, the different advantageous embodiments may be applied to identifying unknown points on an object, such as, for example, a ship, a building, a spacecraft, a submarine, a mountain, a room, a cave, or some other suitable object.

Figure 16:
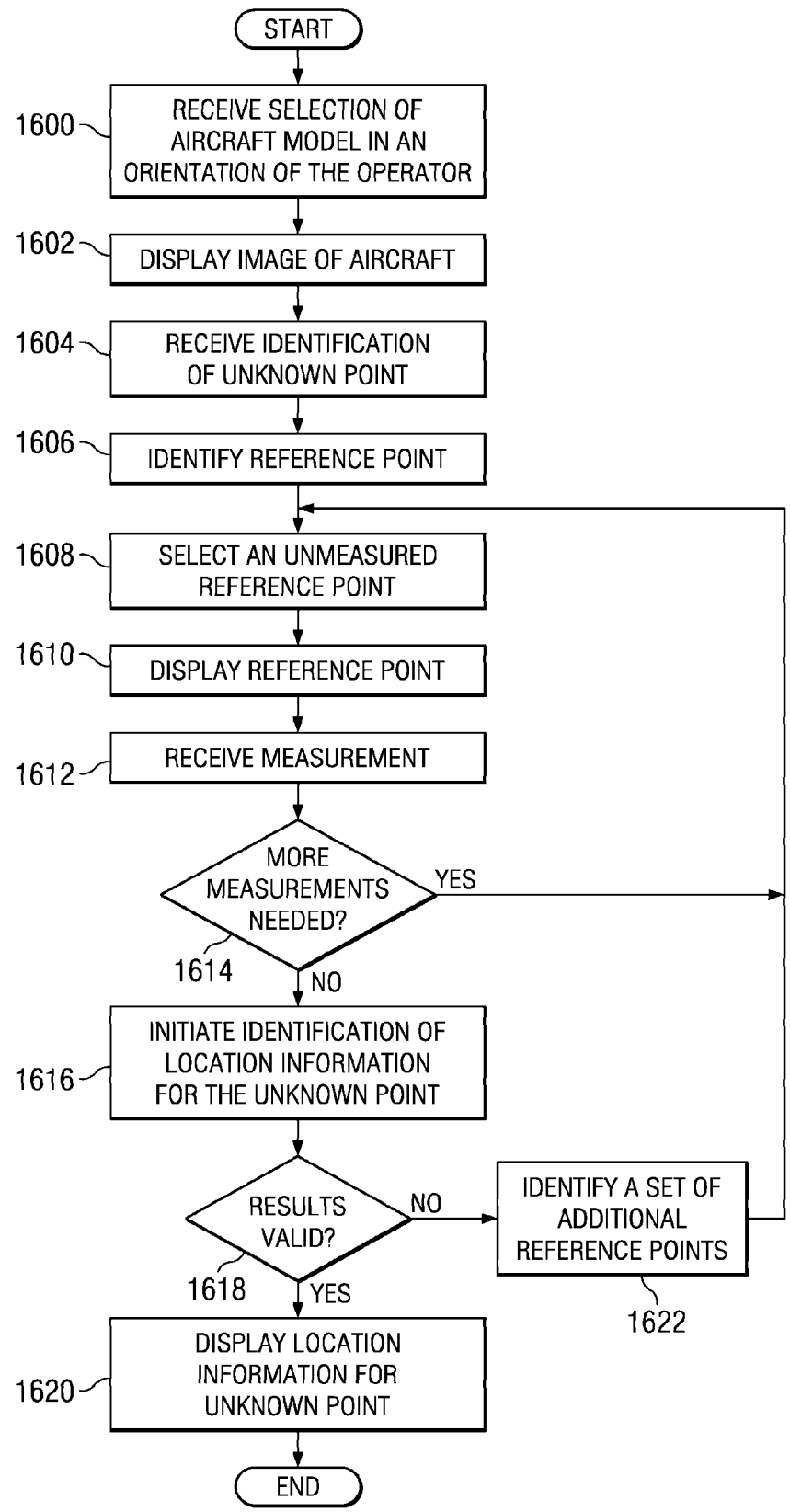
FIG. 16 is a flowchart of a process for identifying an unknown point on an aircraft in accordance with an advantageous embodiment.

Turning now to FIG. 16, a flowchart of a process for identifying an unknown point on an aircraft is depicted in accordance with an advantageous embodiment. The process illustrated in FIG. 16 may be implemented in a process, such as location process 318 in FIG. 3. In this example, measurements are taken from the unknown point.

The process begins by receiving a selection of an aircraft model in an orientation of the operator with respect to the aircraft (operation 1600). The orientation of the operator may be used to identify a particular view of the aircraft to be displayed to the operator. The process then displays an image of the aircraft (operation 1602).

The process receives an identification of an unknown point on the image of the aircraft (operation 1604). This identification may be made by the operator selecting a particular point on the image. In these examples, the unknown point may be a point on the aircraft that the operator sees damage or some anomaly and desires to identify the particular components on that point and nearby that point depending on the size of the damage.

The identification on the point may be made through a pointing device selecting the point on the image. Thereafter, reference points are identified based on the selection on the unknown point (operation 1606). The selection of the reference points are made from reference points found in a model of the aircraft. These reference points have known coordinates. In the different advantageous embodiments, the selected reference points may be selected in a manner such that they are not co-planer or co-linear with respect to each other. Points are considered to be coplanar when these points lie on the same plane. Points are considered to be collinear when these points lie along the same line.

The process then selects an unmeasured reference point from the identified reference points (operation 1608). The process displays the selected reference point (operation 1610), and receives a measurement value for the displayed reference point (operation 1612). A determination is made as to whether more measurements are still needed (operation 1614).

If additional measurements are needed, the process returns to operation 1608. Otherwise, the process initiates identification of location information for the unknown point (operation 1616). In the different advantageous embodiments, one or more algorithms or processes may be initiated to identify location information for the unknown point. In the different advantageous embodiments, a single location method may be or used or multiple location methods may be used. In the depicted examples, two methods, multilateration and linearized least squares, are employed. After results are returned, a determination is made as to whether the results are valid (operation 1618).

The validity of the result in operation 1618 may be determined in a number of different ways. For example, a selected threshold or confidence level may be set and the result of the location method may be compared to see whether they fall within that threshold. These steps may be made with respect to the multilateration and the least squares. If the results are valid, the location information for the unknown point is displayed (operation 1620), with the process terminating thereafter. On the other hand, if the results are not valid in operation 1618, the process identifies a set of additional reference points (operation 1622). This set of additional reference is one or more reference points. By identifying additional reference points, additional measurements may be taken. With the additional reference points, the result of the identification of location information for the unknown point may be more accurate to result in a valid result. The process then returns to operation 1608 to select an unmeasured reference point for measurement as described above.

By using different algorithms or processes for identifying the location information for the unknown point, errors that may occur based on an operators hand or arm moving slightly while making measurements may be reduced. In the different advantageous embodiments, the error may be reduced through the use of multiple location methods. In these examples, multilateration involves the intersection of the spheres, while linearized least squares involves the intersection of planes. The combination of these two location methods produces error that may occur in horizontal and vertical motion.

The process illustrated in FIG. 16 may be performed when the location identification apparatus is located at an unknown point. In other advantageous embodiments, the operator may be located at another point other then the unknown point with this type of implementation.

Figure 17:
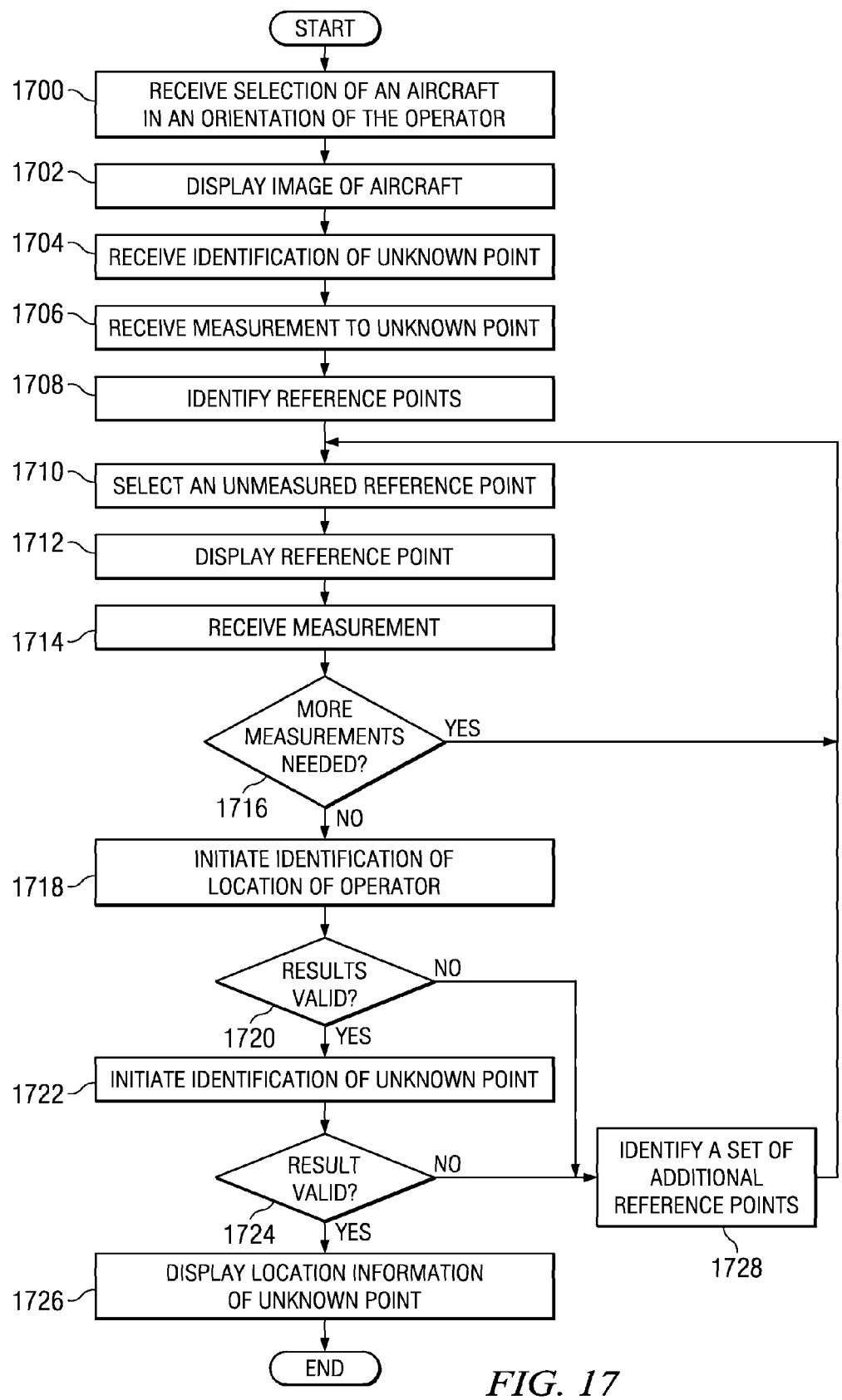
FIG. 17 is a flowchart of a process for identifying location information for an unknown point in accordance with an advantageous embodiment.

Turning now to FIG. 17, a flowchart of a process for identifying location information for an unknown point is depicted in accordance with an advantageous embodiment. The process illustrated in FIG. 17 may be implemented in a process, such as location process 318 in FIG. 3. This process may be implemented when the operator is not located at the unknown point.

The process begins by receiving a selection of an aircraft in an orientation of the operator (operation 1700). Thereafter, an image of the aircraft is displayed (operation 1702). An identification of the unknown point is received (operation 1704). The process also receives a measurement to the unknown point (operation 1706). The process then identifies reference points from a model of the aircraft (operation 1708). The process selects an unmeasured reference point from the identified reference point (operation 1710). The reference point is displayed (operation 1712).

Next, a measurement is received for the displayed reference point (operation 1714). A determination is then made as to whether additional measurements are needed (operation 1716). If additional measurements are needed, the process returns to operation 1710.

Otherwise, identification of the location of the operator is initiated (operation 1718). This identification may be made using one or more processes for identifying unknown points. In these examples, multilateration and linearized least squares are the techniques for processes used to identify the location of the operator.

Thereafter, a determination is made as to whether the results are valid (operation 1720). If the results are valid, identification of the unknown point is initiated (operation 1722). Now that the location information for the operator is known, this information, along with the measurements for the reference points, may be used to identify the location of the unknown point. Again, one or more processes may be used to identify the unknown point at this time.

Thereafter, a determination is made as to whether the result is valid (operation 1724). If the result is valid, the process displays location information from the unknown point (operation 1726), with the process terminating thereafter.

With reference back to operations 1724 and 1720, if in either instance the results are not valid, a set of additional reference points are identified (operation 1728). The process then returns to operation 1710 as described above. These additional reference points are used to provide more information to increase the likelihood that a valid result will occur when the next identification is made.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer usable program code for identifying location information for points associated with an object. An unknown point for the object is identified. Reference points are identified for the object in which locations of the reference points are known in a three-dimensional coordinate system. A measurement in distance to each of the reference points is made to form a plurality of measurements. The location information for the unknown point is identified using the measurements.

In this manner, identification of unknown points may be made more easily with respect to currently available techniques. The different advantageous embodiments employ a location identification apparatus that may be portable and does not need to remain in a single position. The different advantageous embodiments also allow for taking into account minor shifts in the position of the measurement unit as compared to currently available techniques and measurement apparatus.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

For example, the use of the term unknown point has been illustrated with respect to a specific point on an aircraft. Further, an unknown point also may be an identification of an area on the aircraft. For example, the operator may select a section of the image on which the operator sees damage or some anomaly to form the "unknown point" for analysis. With this type of implementation, the unknown point that is returned may be a series of three-dimensional coordinates that define the selected area. Further, different advantageous embodiments may provide different advantages as compared to other advantageous embodiments.

What is claimed is:

1. A computer implemented method for identifying location information of an unknown point on an aircraft, the computer implemented method comprising:
    identifying the unknown point on the aircraft;
    identifying a plurality of reference points for the aircraft located from a group of reference points for the aircraft, wherein the plurality of reference points have known locations described using a three-dimensional coordinate system to form a plurality of identified reference points;
    displaying the plurality of identified reference points on a set of images of the aircraft;
    responsive to displaying the plurality of identified reference points on the set of images, measuring the distance to each of the plurality of identified reference points to form a plurality of measurements; and
    identifying the location information of the unknown point using the plurality of measurements.

2. The computer implemented method of claim 1, wherein the step of identifying the location of the unknown point using the plurality of measurements comprises:
   generating first location information for the unknown point using a first location process; and
   generating second location information for the unknown point using a second location process.

3. The computer implemented method of claim 1 further comprising:
   displaying the location information of the unknown point identified using the plurality of measurements.

4. The computer implemented method of claim 1, wherein the displaying step comprises:
   displaying the each of the plurality of identified reference points on a different image in the set of images of the aircraft.

5. The computer implemented method of claim 4, wherein the measuring step comprises:
   receiving the measurement of the distance to the each of the plurality of identified reference points from a measurement unit to form the plurality of measurements.

6. The computer implemented method of claim 1, wherein the plurality of measurements are from the unknown point to the plurality of reference points.

7. The computer implemented method of claim 1, wherein the plurality of measurements are from an observation point to the plurality of reference points and further comprising:
   obtaining an additional measurement from the observation point to the unknown point, wherein the additional measurement is part of the plurality of measurements.

8. The computer implemented method of claim 1, wherein the identifying step comprises:
   selecting the plurality of reference points from the group of reference points for the aircraft as reference points associated with features on the aircraft that are identifiable by a human operator.

9. The computer implemented method of claim 1, wherein the three-dimensional coordinate system is selected from one of a Cartesian coordinate system, a spherical coordinate system, and a cylindrical coordinate system.

10. The computer implemented method of claim 1, wherein the unknown point on the aircraft is selected from one of a first point on an interior of the aircraft and a second point on an exterior of the aircraft.

11. The computer implemented method of claim 1 wherein the reference points are located on the aircraft.

12. The computer implemented method of claim 1 wherein the step of identifying the location information of the unknown point using the plurality of measurements further comprises utilizing a method selected from the group consisting of triangulation, trilateration, and multilateration.

13. A computer implemented method for identifying location information for points associated with an object, the computer implemented method comprising:
   identifying an unknown point for the object;
   identifying a plurality of reference points for the object, wherein locations of the plurality of reference points are known in a three-dimensional coordinate system;
   measuring distance from the unknown point to each of the plurality of reference points to form a plurality of measurements; and
   identifying the location information for the unknown point using the plurality of measurements.

14. The computer implemented method of claim 13, wherein the identifying step comprises:
   identifying the plurality of reference points for the object from a model of the object, wherein the locations of the plurality of reference points are known in the model and are described in the three-dimensional coordinate system.

15. The computer implemented method of claim 13, wherein the object is selected from one of an aircraft, a ship, a building, a spacecraft, a submarine, a mountain, a room, and a cave.

16. An apparatus comprising:
   a model of an object;
   a location process capable of identifying an unknown point on an aircraft; identifying a plurality of reference points for the aircraft located in a three-dimensional model of the object, wherein the plurality of reference points have known locations described using a three-dimensional coordinate system to form a plurality of identified reference points; displaying the plurality of identified reference points on a set of images of the object; measuring distance to each of the plurality of identified reference points to form a plurality of measurements in response to displaying the plurality of identified reference points on the set of images; and identifying a location of the unknown point using the plurality of measurements; and
   a portable data processing system, wherein the model of the object and the location process are located on the portable data processing system.

17. The apparatus of claim 16 further comprising:
   a measurement unit capable of measuring distances to the plurality of identified reference points.

18. The apparatus of claim 16, wherein the plurality of measurements are received from the measurement by user input.

19. The apparatus of claim 16, wherein the portable data processing system and the measurement unit are located in a single housing.

20. A computer program product for identifying location information of an unknown point on an aircraft, the computer program product comprising;
   a non-transitory computer readable media;
   program code, stored on the computer readable media, for identifying the unknown point on the aircraft;
   program code, stored on the non-transitory computer readable media, for identifying a plurality of reference points for the aircraft located in a three-dimensional model of the aircraft, wherein the plurality of reference points have known locations described using a three-dimensional coordinate system to form a plurality of identified reference points;
   program code, stored on the non-transitory computer readable media, for displaying the plurality of identified reference points on a set of images of the aircraft;
   program code, stored on the non-transitory computer readable media, responsive to displaying the plurality of identified reference points on the set of images, for obtaining a measurement of distance to each of the plurality of identified reference points to form a plurality of measurements; and
   program code, stored on the non-transitory computer readable media, for identifying the location information of the unknown point using the plurality of measurements.

21. The computer program product of claim 20, wherein the program code for identifying the location of the unknown point using the plurality of measurements comprises:
   program code, stored on the non-transitory computer readable media, for generating first location information for the unknown point using a first location process;

program code, stored on the non-transitory computer readable media, for generating second location information for the unknown point using a second location process.

22. The computer program product of claim 20 further comprising:
program code, stored on the non-transitory computer readable media, for displaying the location information of the unknown point identified using the plurality of measurements.

23. The computer program product of claim 20, wherein the program code for displaying the plurality of identified reference points on a set of images of the aircraft comprises:
program code, stored on the non-transitory computer readable media, for displaying the each of the plurality of identified reference points on a different image in the set of images of the aircraft.

* * * * *